US009789632B2

(12) United States Patent
James

(10) Patent No.: US 9,789,632 B2
(45) Date of Patent: Oct. 17, 2017

(54) TEMPERATURE REGULATION APPARATUS AND METHOD

(71) Applicant: RITEMP PTY LTD, Eastwood (AU)

(72) Inventor: Malcolm Barry James, Campbelltown (AU)

(73) Assignee: RITEMP PTY LTD, Eastwood (AU)

( * ) Notice: Subject to any disclaimer, the term of this patent is extended or adjusted under 35 U.S.C. 154(b) by 529 days.

(21) Appl. No.: 14/363,573

(22) PCT Filed: Dec. 6, 2012

(86) PCT No.: PCT/AU2012/001506
§ 371 (c)(1),
(2) Date: Jun. 6, 2014

(87) PCT Pub. No.: WO2013/082675
PCT Pub. Date: Jun. 13, 2013

(65) Prior Publication Data
US 2014/0331701 A1 Nov. 13, 2014

(30) Foreign Application Priority Data
Dec. 9, 2011 (AU) .................................. 2011905127

(51) Int. Cl.
*F25B 1/00* (2006.01)
*B29C 33/02* (2006.01)
*B29C 35/00* (2006.01)
*B29C 45/73* (2006.01)
*F28D 15/02* (2006.01)
*B22C 9/06* (2006.01)
*B22D 17/22* (2006.01)
*F28D 21/00* (2006.01)

(52) U.S. Cl.
CPC ............ *B29C 33/02* (2013.01); *B29C 35/007* (2013.01); *B29C 45/7312* (2013.01); *F25B 1/005* (2013.01); *F28D 15/02* (2013.01); *B22C 9/065* (2013.01); *B22D 17/2218* (2013.01); *F28D 2021/0077* (2013.01)

(58) Field of Classification Search
CPC ........ B29C 45/7312; B29C 2045/7325; B29C 2045/7318; B29C 35/007; B29C 33/02; B29C 51/428; B22C 9/065; F28D 15/02
See application file for complete search history.

(56) References Cited

U.S. PATENT DOCUMENTS

| 4,553,505 A | * | 11/1985 | Hirano | .................. F01P 3/2285 123/41.2 |
| 7,143,814 B1 | * | 12/2006 | James | ..................... B29C 45/73 164/348 |
| 7,527,756 B2 | | 5/2009 | Miyagawa et al. | |

FOREIGN PATENT DOCUMENTS

JP 58215309 A 12/1983

OTHER PUBLICATIONS

International Search Report received for PCT Appl. No. PCT/AU2012/001506, dated Feb. 18, 2013, 7 pages.

* cited by examiner

*Primary Examiner* — Elizabeth Martin
(74) *Attorney, Agent, or Firm* — Arc IP Law, PC; Joseph J. Mayo

(57) ABSTRACT

A machine for a temperature regulation arrangement that includes a closed area within the machine leading a temperature regulating chamber positioned adjacent a heat source, in which there are a number of liquid collectors arranged so that each has a feed take off that provides a elevated passage way from one liquid collector to the next.

8 Claims, 5 Drawing Sheets

TEMPERATURE REGULATION APPARATUS AND METHOD

This invention relates to temperature regulation as applying to machines and has a particular application to molds.

BACKGROUND OF THE INVENTION

I have previously developed techniques for temperature regulation of molds where there is provided a cooling chamber adjacent a source of heat where there is a liquid in the cooling chamber and a space above the liquid where there is only substantially the vapour of the liquid.

This development allows for better heat transfer between hotter and colder portions of the cooling chamber subject to the source of heat.

In examples of this arrangement, there has been provided a condenser within the space and at an upper level.

For heat to be transferred, it is known that liquid in its unvaporised form could be directed to the location requiring heat reduction whereupon the liquid will be vapourised using the heat of vaporisation to that effect.

In order to achieve such supply of liquid, in some instances it is desirable to transfer such liquid through a conduit with its outlet directed toward the location that is expected to require extra heat removal capacity.

A technique for doing this can be to provide a feed pipe from a condensation collection trough immediately beneath the condenser within the space then feed such liquid as it collects through the pipe into a directional outlet so that the liquid will then be directed specifically against the higher heat providing location as a contribution toward a total heat distribution throughout the space.

The problem to which this invention is specifically directed then relates to the problem that if there might be needed more than one such directional outflow and if such a directional flow is at a height below the collection trough that is different from another, then the physical effect of the "head of liquid" will result in liquid potentially passing more quickly and therefore at greater volume where a directional outlet is lower than one of the others fed from the same head source.

This problem is accentuated where there might be a larger number of such directional liquid outlets required at varying heights within a die or mold and it is the problem addressed by this invention which is to at least provide some reduction in the differential that might be caused by different head heights from a liquid source or at least provide the public with a useful alternative.

The cooling of machines, and in particular machines that use dies or moulds, for example injection moulding machines, is important to ensure that the mould maintains the correct temperature during the formation of the moulded article. This is very important in the preparation of plastic products formed and in maintaining economical cycle times using injection moulding techniques as the process of injection moulding large numbers of items can result in the temperature of the mould itself increasing over a time period of use and therefore increasing the length of time.

To solve this problem it is known to make use of cooling channels in the mould itself, usually passing a liquid through the discrete cooling channels in order to remove the build up of heat from the mould. However, this has shown to be only partially effective as the removal of the heat is inefficient due to the narrow channels used allowing for the formation of hot spots, which results in differential (uneven) cooling rates across the mould.

Water is used as the cooling liquid and, over time, this results in corrosion of the mould in the presence of air and build up of scale inside the cooling channels. As such it is important with a water-cooled mould to ensure that the cooling channels are maintained in a serviceable manner so as to be able to prevent corrosion, which can result in the mould having a shortened lifespan.

The increased service required however adds to the costs associated with the use of these moulds and their downtime due to the high frequency of servicing for preventative maintenance procedures.

It is known to employ moulds with cooling chambers that have heat exchangers to increase dramatically the efficiency of cooling the mould whilst also allowing for faster cycle times between mouldings.

Whilst this approach has been useful the use of water still retains the drawbacks of needing a heat exchange element adjacent the moulds cooling chambers to convert the steam produced during the cooling process back into water to repeat the cooling cycle within the cooling chamber.

BRIEF DESCRIPTION OF THE INVENTION

In one form of this invention although it need not necessarily be the only or indeed the broadest form of this, there is proposed a machine with a temperature regulation arrangement therein comprising or including a closed area within the machine leading a temperature regulating chamber positioned adjacent a heat source, liquid in the closed area, a head space within the closed area containing substantially only the vapour of the liquid, a liquid collector within the head space for holding as a reservoir some of the liquid in the closed area at an elevated height in the closed area, a conduit from said liquid collector to direct said liquid from within said liquid collector to a first lower level within the closed area, a feed take off from said first lower level, a conduit from said first lower level to a second lower level which is lower than said first lower level by which liquid from within the first level is to be directed to said second lower level, a feed take off from said second lower level, and where the shape of the conduit or its take off position is arranged to provide a height barrier to passage of liquid there past.

By having a height barrier, either by reason of a shape of a conduit, or simply a provision as a weir, there can be provided a break in any continuous liquid head so that the liquid provided with a feed take off or if desired feed take offs will be relatively consistent head for each feed take off.

In preference, the machine is a plastic injection mold.

In preference, there is a reservoir at at least one of the levels, and in preference, at each of the levels.

In preference, there are means to provide a supply of liquid from within the head space to an elevated position within the head space.

In preference, such means to effect supply of liquid can comprise a condenser positioned so that the condensed liquid directed at least to some extent toward the liquid collector.

In preference, in an alternate form, liquid is provided by being elevated through a thermo siphon arrangement.

In a further alternate arrangement, liquid is provided to the liquid collector by means of a pump.

In preference, where each respective level has a reservoir, one or more feed take offs from each respective level are arranged so as to maintain a liquid supply within its reservoir with some excess to feed further levels below the respective level.

In preference, the height barrier is provided by the reservoir having an elevated outlet to a lower level.

In preference, there is a gooseneck conduit providing connection between respective levels where, because the vapour pressure within the head space is substantially that of the liquid within the head space, liquid will not act in a conventional siphon manner.

In a further form of the invention there is provided a method for removing heat from a system that requires heat to be removed from it, wherein the system has at least one cooling chamber, including an inlet pipe and an outlet pipe, and an internal cavity in which heat is absorbed, the method including the steps of;

at least partially filling the cooling chamber with a liquid phase refrigerant through the inlet pipe;

the liquid phase refrigerant vaporising to a vapour phase refrigerant by heat transferred from the internal mould cavity to the cooling chamber;

the vapour phase refrigerant then being removed from the cooling chamber and channelled to a compressor;

the compressor compressing the vapour phase refrigerant to reform the liquid phase refrigerant;

the liquid phase refrigerant then passing to a heat exchanger to remove heat from the liquid phase refrigerant;

then recycling the cooled liquid phase refrigerant to the cooling chamber though the inlet pipe.

In preference, passing the liquid phase refrigerant to a cooling device to further cool the liquid phase refrigerant to a working temperature In yet a further form of the invention there is provided a method of cooling a mould, the mould having at least one cooling chamber, including an inlet pipe and an outlet pipe, and an internal mould cavity, the method including the steps of;

at least partially filling the cooling chamber with a liquid phase refrigerant through the inlet pipe;

the liquid phase refrigerant vaporising to a vapour phase refrigerant by heat transferred from the internal mould cavity to the cooling chamber;

the vapour phase refrigerant then being removed from the cooling chamber and channelled to a compressor;

the compressor compressing the vapour phase refrigerant to reform the liquid phase refrigerant;

the liquid phase refrigerant then passing to a heat exchanger to remove heat from the liquid phase refrigerant;

then recycling the cooled liquid phase refrigerant to the cooling chamber though the inlet pipe.

In preference, passing the liquid phase refrigerant to a cooling device to further cool the liquid phase refrigerant to a working temperature.

In preference, the compression of the vapour phase refrigerant to reform the liquid phase refrigerant is adiabatic compression.

In preference, the temperature of the liquid phase refrigerant entering the cooling chamber is substantially similar to the temperature of the vapour phase refrigerant then being removed from the cooling chamber.

In preference, the refrigerant is at least one selected from a group which includes ethane, propane, butane and ammonia.

In preference, the heat exchanger is connected to a cooling tower to remove heat from liquid phase refrigerant.

In preference, the mould is an injection mould.

In preference, the liquid phase refrigerant includes a surfactant.

A moulding machine for moulding materials, the mould having a having at least one cooling chamber, including an inlet pipe and an outlet pipe, and an internal mould cavity, the machine including:

means for supplying a flow of a liquid phase refrigerant at a predetermined temperature through the inlet pipe to the at least one cooling chamber;

a conduit for channelling a vapour phase refrigerant formed by the transfer of heat from the internal mould cavity to the liquid phase refrigerant in the cooling chamber to a compressor where said vapour phase refrigerant is compressed to produce reformed liquid phase refrigerant;

a second conduit to channel the reformed liquid phase refrigerant to a heat exchange unit;

means for recycling the reformed liquid phase refrigerant to the at least one cooling chamber.

In preference, there is a cooling means to further cool the reformed liquid phase refrigerant to the predetermined temperature.

In preference, the compressor compresses the vapour phase refrigerant adiabatically.

In preference, a pressure control valve is positioned between the heat exchanger and the cooling means to meter the flow of liquid phase refrigerant to the cooling means.

In preference, the cooling means is an evaporator.

In preference, the evaporator has a gas return conduit to take any uncondensed vapour phase refrigerant back to the compressor

BRIEF DESCRIPTION OF THE DRAWINGS

For a better understanding of this invention it will now be described with reference to embodiments which with the assistance of drawings wherein.

DETAILED DESCRIPTION OF THE INVENTION

Figure 1:
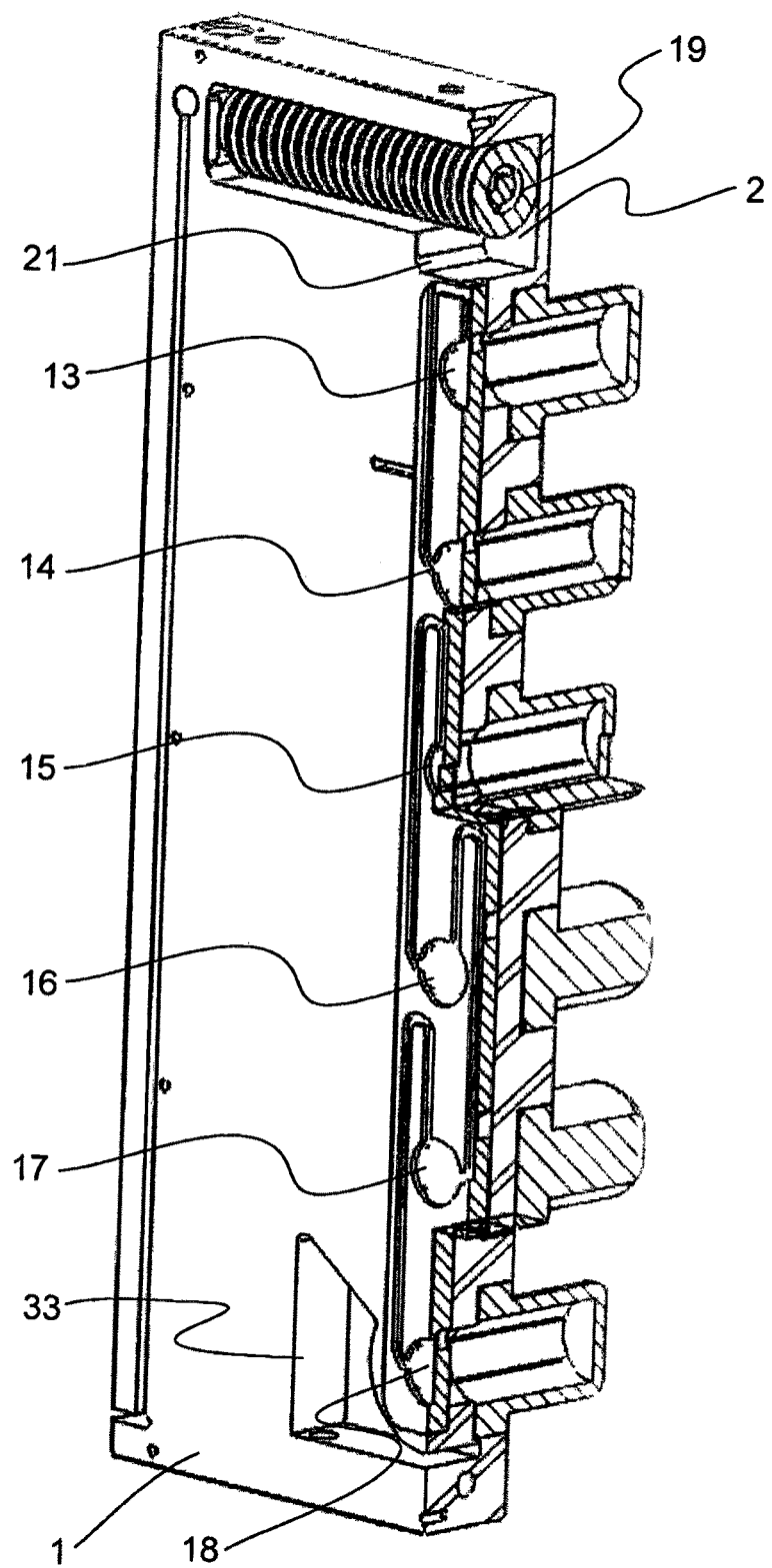
FIG. 1 is a perspective view of injection die portion with part cut away in cross section and with a side plate removed.

Referring in detail to the drawings, the invention in its broadest sense can apply to any machine where temperature regulation is called for.

One application that has been found to be particularly relevant relates to molds for injection plastics where extraction after molding of a finished product has to wait until the plastic has cooled sufficiently to be self supporting and therefore able to be extracted as an integral article.

Getting cooling and especially somewhat uniform coiling to all parts of the injected product then becomes very important and can be very critical in obtaining good cycle times.

I have previously disclosed a technique where there is a cooling space adjacent a heat source and within the cooling space there is a liquid and above this only substantially the vapour of the liquid within the space.

There are condensing means appropriately placed at another part within the space or as part of the wall of the space.

The problem to which this invention is being directed relates to this same process although it can apply more broadly to any machine. Nonetheless where some of the liquid is selectively directed to an area this allows for selective control of an amount of liquid directed into an area and therefore it allows for better control of distribution of liquid and leads to better temperature regulation.

If the liquid within the space is fed through a conduit, the pressure applicable to causing such liquid to pass through will be to a significant extent governed by the so called "head of liquid" from which the liquid is being supplied.

Accordingly, according to traditional techniques, such head while it might be appropriate for one level below say a condenser within the space, nonetheless, where a take off might be somewhat lower than another take off, the difference in head could cause significant differences in the extent of fluid flow being effected through a similar take off and this can therefore reduce the uniformity that one can obtain between the take offs.

The solution has been to provide a form of overflow where the liquid can be supplied to a selected level and any excess within that level then fed to a lower level but in such a way that this will not unnecessarily build up an excessive head of liquid to the further lower levels.

This can be achieved by use of a simple conduit in the form of a gooseneck where, because the environment within the space above liquid is only or at least substantially only the vapour of that liquid, then this will ensure that a continuity of liquid needed for a siphon effect will not be maintained.

In other words, the atmosphere within the space is the vapour pressure of the liquid so that a gooseneck will not in the ordinary sense therefore siphon.

The arrangement also provides in this embodiment that there be provided in effect reservoirs at selected heights within the die and the take off tubes which can be one or two or more, are chosen to have a size that will function sufficiently with the given head of water. In practice there will be excess water which will flow through in the case of the application to lower reservoirs and of course such that each of the reservoirs is adequately supplied by this overflow.

This action is shown in the embodiments which are described in the drawings where the drawing itself shows a die or mold where the part shown is one part only of a two part die where there is another part which is also equally configured to effect such cooling but as the die parts separate, they are individually cooled.

Figure 2:
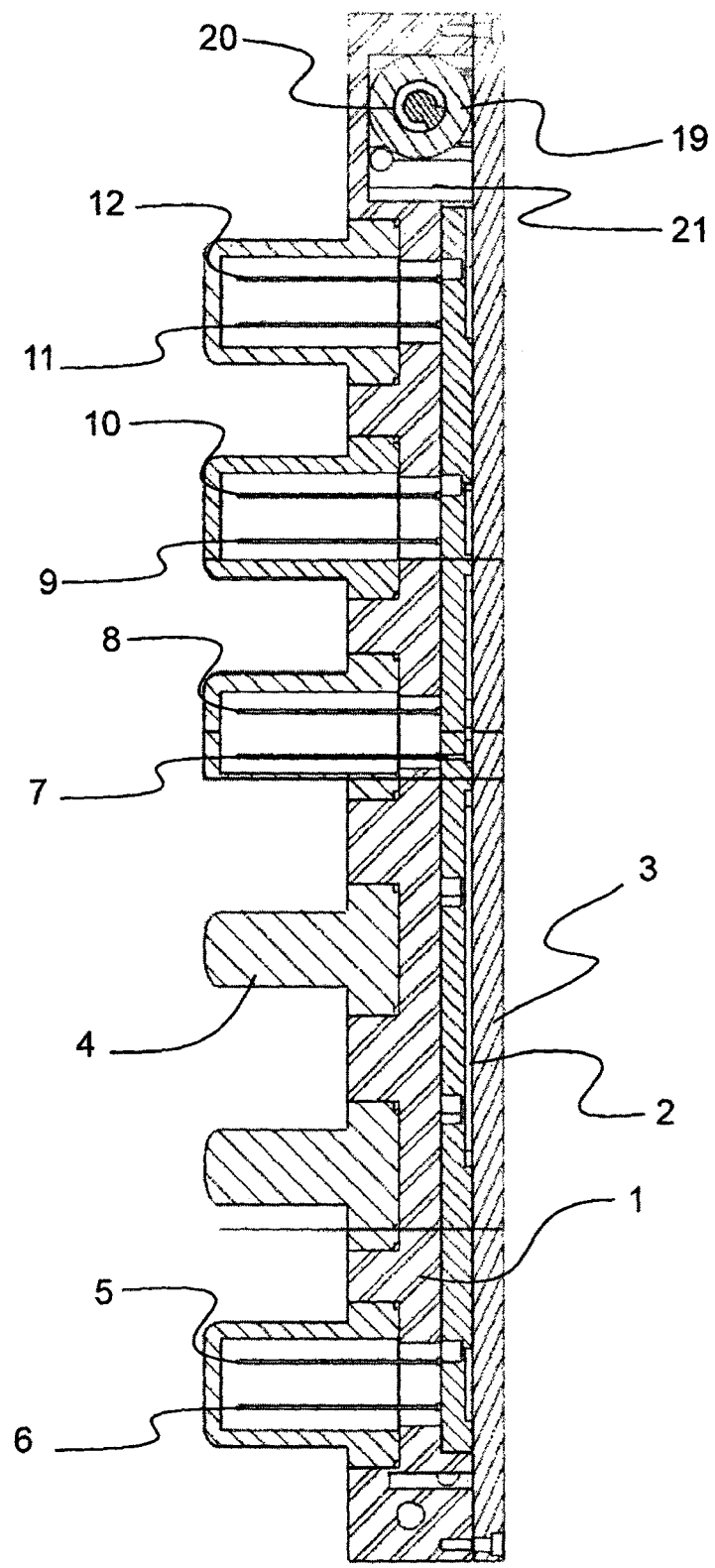
FIG. 2 is a cross section through the same portion as shown in FIG. 1 with however a side plate in position.
Figure 3:
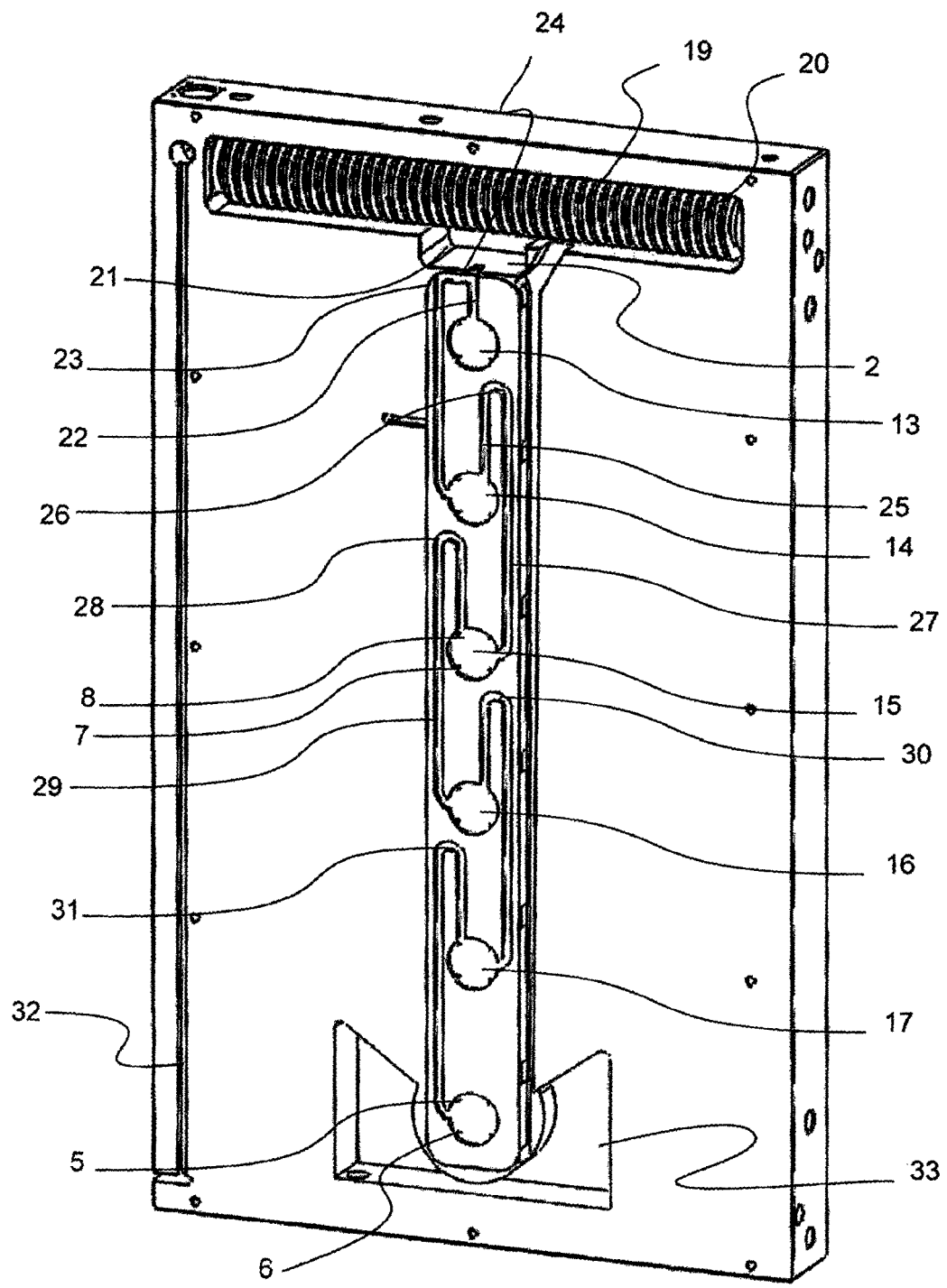
FIG. 3 is a perspective view of the same portion as in FIGS. 1 and 2 with again the side plate removed but otherwise showing visible areas.

Accordingly, referring to FIGS. 1, 2 and 3 there is a body 1 which has enclosed cooling area 2 which contains though this is not specifically shown in the drawings a liquid which in this case is water or water with additives as has been explained in earlier patents of mine, where the space 2 is defined by a backing plate 3 and a molding portion 4.

Within portions of the molding surface 4 are take off tubes shown typically at 5 and 6, 7 and 8, 9 and 10, 11 and 12.

In each case those shown in FIG. 2 are duplicated by further take offs behind these shown.

Each of the take off tubes are fed from respective reservoirs which are shown 13, 14, 15, 16, 17.

At an upper location within the space 2 is a condenser with a number of fins and having running therethrough a conduit through which cooling liquid can be passed to keep the temperature of the condenser 19 at a selected condensing temperature.

In this case, the liquid resulting from condensation of vapour rising condenses and causes liquid to flow into a first reservoir area 21 from whence it is directed through a first conduit 22 to a first reservoir area 13.

At the same time, there is a further conduit which feeds to a lower reservoir area 14 through a gooseneck shaped conduit at 24 through a conduit 23.

From the reservoir 14, there is a conduit rising 25 that then follows a gooseneck with the apex of the gooseneck at 26 so that liquid then is overflowing through the gooseneck 26 and conduit 27 to reservoir 15.

Because the atmosphere within the space is generally comprised only substantially only of the vapour of the liquid within the space, this will cause any break in syphoning effect that otherwise might occur so that the head of water effective for the respective lower reservoirs eg. 14 or 15 or others, is only that defined by the head of water within the down side of the respective gooseneck.

In this case there are of course further reservoirs and further goosenecks where for instance gooseneck 28 is fed from reservoir 15 and feeds through conduit 29 to reservoir 16. Reservoir 16 in turn feeds gooseneck 30 into reservoir 17 which in turn feeds gooseneck 31. This in turn feeds into reservoir 18.

In respect of each of the reservoirs there are the four take offs in each case and for the sake of clarity the number of these not separately identified.

Inlets occur at spaced apart locations and have in each case a relatively consistent common size inlet.

Such aspects can of course be varied so that there is some control as to the amount of liquid available and be used at each level.

Further aspects of the die or mould include a thermo siphon to lift liquid into the upper space as needed this being shown at 32 where there is a lower conduit not specifically shown from lower space area 33.

Figure 5:
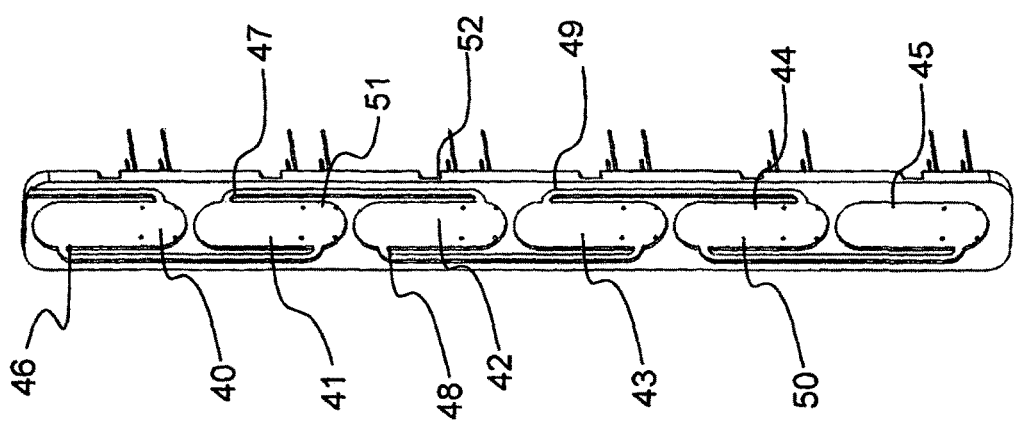
FIG. 5 is a view from the front of the same assembly as in FIG. 4.
Figure 4:
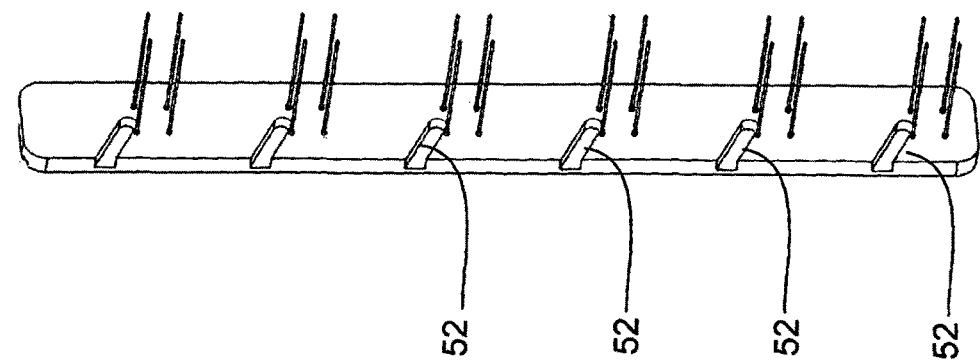
FIG. 4 is a perspective view an assembly that is a functional part of the system that will be within a die part to effect uniformity of distributed cooling with some differences according too a second embodiment.

In the further drawings FIGS. 4 and 5 these show simply the functional part within a die part which incorporates this invention.

Accordingly there are a plurality of cascade reservoirs 40 through 45 where each is of elongate shape so that the effect of separating heads of liquid are achieved by having a raised overflow that acts then as a cascade overflow shown at 46 through 50.

This in effect then acts as a weir.

The inlets to conduit feeds are arranged as shown typically at 51.

There are shown especially in FIG. 4 return passageways for evaporated vapour at typically 52.

Figure 6:
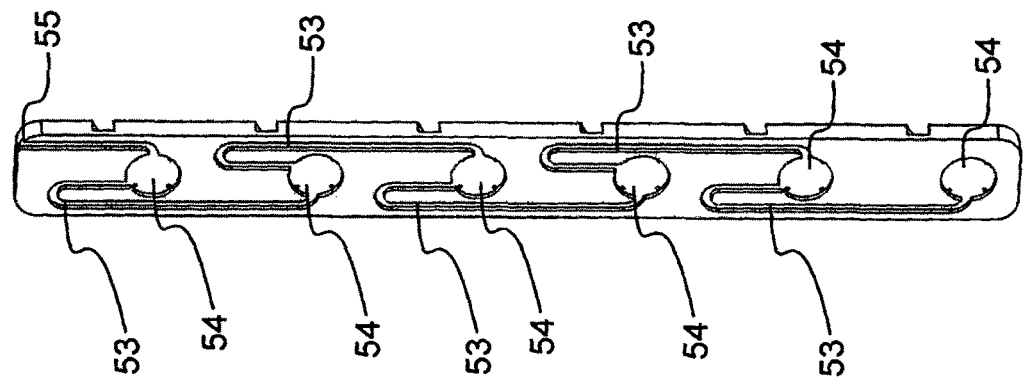
FIG. 6 is a simplified view of the assembly in FIGS. 4 and 5.

FIG. 6 shows the same insert portion as in the first embodiment with gooseneck conduits 53 feeding successive reservoirs 54 from an upper area 55.

This then illustrates how the invention will operate.

Figure 7:
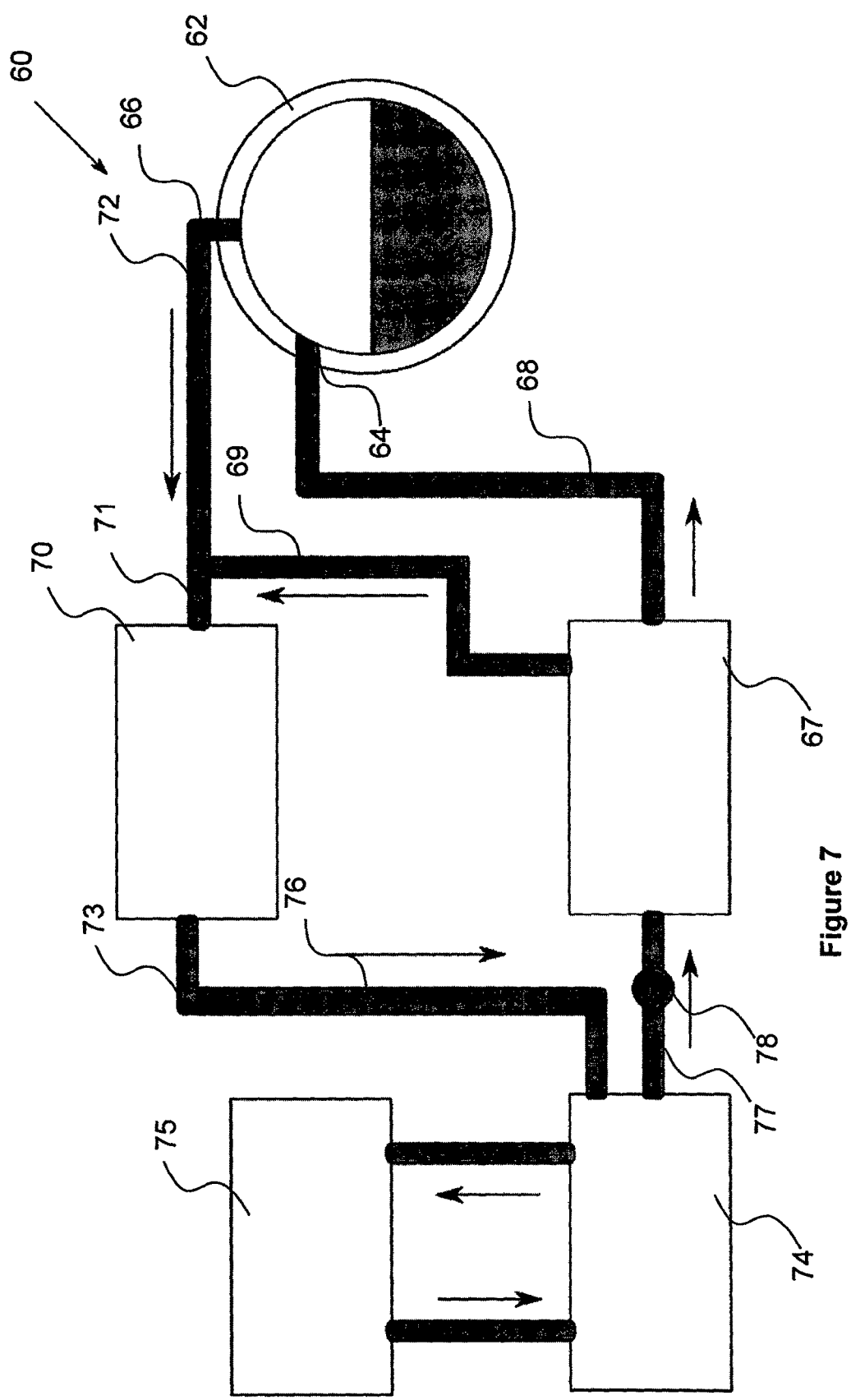
FIG. 7 shows a schematic view of the system of a further form of the invention.

With reference to FIG. 7 an embodiment of the present invention is shown in which there is a system 60 having a mould with an internal cavity within which plastic material can be injected to form a predefined shape, referred to as injection moulding. The mould is typically formed from two parts as those skilled in the art would know. In this figure the schematic only shows one half of a mould as a' representative section and the invention is not to be limited by this.

FIG. 7 shows the at least one internal cooling chamber 62, chamber cover not shown. The cooling chamber 62 further has an coolant inlet pipe 64 and a coolant outlet pipe 66 to provide entry and exit for a cooling liquid/refrigerant. The shape and size of the cooling chamber 62 may vary according to specific needs of design as required.

The evaporator 67 is connected to the cooling chamber 62 of the mould via the coolant inlet pipe 64 to feed liquid refrigerant 68 at a predefined temperature to the cooling chamber 62.

A compressor 70 has an inlet pipe 22 through which it receives refrigerant 72 in the vapour phase and then compresses the vapour phase 72 to produce a liquid phase refrigerant 73.

The heat exchange unit 74 is fluidly connected to the compressor 70 by the pipe 76, the heat exchanger 74 removes the bulk of any heat within the liquid phase refrigerant 73 and then the liquid phase refrigerant 77 is then passed through a pressure control valve 78 and directed to the evaporator unit 67 for cooling to the predetermined temperature to provide recycled liquid phase refrigerant 68.

In use, the liquid phase refrigerant 68 is a refrigerant material suitable for the purpose and can be selected from any suitable refrigerant material such as ammonia, butane, propane, ethane and $CO_2$ for example. Other suitable low boiling point liquids can be employed and the person skilled in the art without departing from the scope of the present invention.

The liquid phase refrigerant 68 is then supplied to the cooling chamber 62 of the mould. As hot plastics material is injected into the mould cavity, the heat from the hot plastics material is transferred to the walls of the mould cavity and this then is transferred to the liquid phase refrigerant 68, which then evaporates to produce a vapour phase refrigerant 72 thus producing an evaporative cooling effect.

The temperature of the vapour phase refrigerant 72 is substantially the same as the liquid phase refrigerant 16 that has entered the cooling chamber 62, the absorbed thermal energy of the plastics material being used to convert the liquid phase refrigerant 68 to the vapour phase refrigerant 72.

The vapour phase refrigerant 72 is then drawn off to an upper portion of the cooling chamber and is channelled to the compressor 70 where the vapour phase refrigerant 72 is compressed back into a liquid phase refrigerant 73. The liquid supply temperature from the compressor is under the control of a thermostat. At this stage there is a substantial build up of temperature in the liquid phase refrigerant 73.

This hot liquid phase refrigerant 73 is than channelled to a heat exchanger unit 74 to take of the bulk of the heat in the liquid phase refrigerant 73 from conversion of the vapour phase refrigerant 72 to the liquid phase refrigerant 73. A cooling section 75 is operatively connected to the heat exchanger 74 to then dispose of any excess heat in the heat exchanger 74.

The liquid phase refrigerant 77 from the heat exchanger 74 is still typically at a temperature that is greater than the temperature at which it is required to be in order to be used as a cooling liquid for the mould. As such, the liquid phase refrigerant 77 is passed through a pressure control valve 78 to regulate the feed of liquid phase refrigerant 77 into the evaporator unit 67, which cools the liquid phase refrigerant 34 to a temperature suitable for cooling use in the mould. Any excess vapour phase refrigerant is then directed towards the compressor via pipe 69.

The use of such a system and method as described results in a simpler system that is presently used in mould cooling setups that employ water as the cooling liquid. The internal architecture of the cooling chamber is therefore less complicated than those of previous designs that might use a condenser.

This new system and method also provides for increased cooling efficiency of the mould, allowing for potentially a decrease in time between cycles due to the efficient heat take off from the mould.

Such a system can be employed in such apparatus as moulding machines, as described above, and other machines or systems in which there is build up of heat and there is a need to remove the heat away from the system, for, example in engines.

What is claimed is:

1. A machine with a temperature regulation arrangement therein comprising:
    a closed area within the machine leading a temperature regulating chamber positioned adjacent a heat source,
    a liquid in the closed area,
    a head space within the closed area containing substantially only vapor of the liquid,
    a liquid collector within the head space configured to hold as a reservoir, wherein some of the liquid in the closed area is at an elevated height in the closed area,
    a first gooseneck conduit from said liquid collector to direct said liquid from within said liquid collector to a first lower level within the closed area,
    a feed take off from said first lower level,
    a second gooseneck conduit from said first lower level to a second lower level, wherein said second lower level is lower than said first lower level by which said liquid from within the first lower level is to be directed to said second lower level,
    a feed take off from said second lower level,
    wherein the shape of the second gooseneck conduit provides a height barrier to passage of said liquid there past, and
    wherein at least one of said first lower level and said second lower level comprises a reservoir.

2. The machine of claim 1, further comprising a condenser to provide a supply of liquid from within the head space to an elevated position within the head space.

3. The machine of claim 1, further comprising a condenser to effect a supply of liquid, wherein said condenser is positioned such that condensed liquid is directed toward the liquid collector.

4. The machine of claim 3, wherein each of said first lower level and said second lower level comprises said reservoir, wherein said feed take offs from each of said first lower level and said second lower level are arranged to maintain a liquid supply within the reservoirs of said first lower level and said second lower level with some excess to feed further levels below the first lower level and the second lower level.

5. The machine of claim 1, wherein said liquid is provided by being elevated through a thermo siphon arrangement.

6. The machine of claim 1, further comprising a pump and wherein said liquid is provided to the liquid collector by said pump.

7. The machine of claim 1, wherein the height barrier is provided by the reservoir having an elevated outlet to a lower level of said first lower level and said second lower level.

8. The machine of claim 7, further comprising a third gooseneck conduit that provides a connection between said first lower level and said second lower level, wherein vapor pressure within the head space is substantially that of the liquid within the head space, such that the liquid will not act in a siphon manner.

* * * * *